Jan. 27, 1925.　　　　R. W. ATKINSON　　　　1,524,226
ELECTRICAL INSTALLATION
Filed April 17, 1922
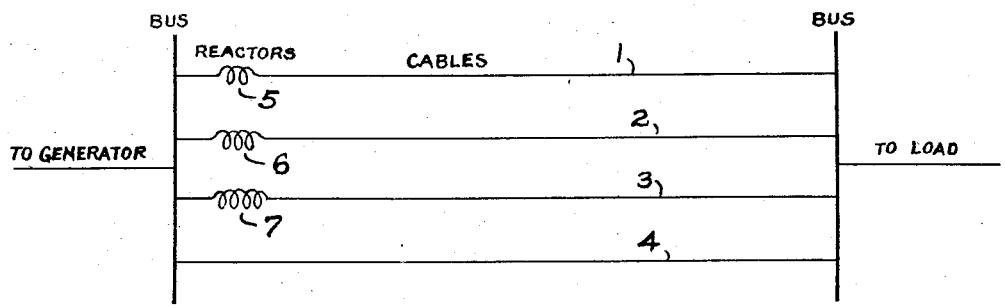
WITNESSES
INVENTOR
Ralph W. Atkinson
by Christy and Christy
his attorneys Patented Jan. 27, 1925.

1,524,226

UNITED STATES PATENT OFFICE.

RALPH W. ATKINSON, OF PERTH AMBOY, NEW JERSEY, ASSIGNOR TO STANDARD UNDERGROUND CABLE COMPANY, OF PITTSBURGH, PENNSYLVANIA, A CORPORATION OF PENNSYLVANIA.

ELECTRICAL INSTALLATION.

Application filed April 17, 1922. Serial No. 554,298.

*To all whom it may concern:*

Be it known that I, RALPH W. ATKINSON, residing at Perth Amboy, in the county of Middlesex and State of New Jersey, a citizen of the United States, have invented or discovered certain new and useful Improvements in Electrical Installations, of which improvements the following is a specification.

My invention relates to electric cable installations and consists in an organization wherein disadvantageous limitation upon apparatus connected in parallel is removed. I have developed the invention in application to parallel cables for carrying a single aggregate alternating current, and in that application I shall first describe it.

In the accompanying drawing I show diagrammatically an installation in which, as hereinafter described, my invention will be found.

In underground installation (and the same observation holds, as presently will appear, wherever heat dissipation is similarly embarrassed) the current-carrying capacity of a given cable is practically limited by temperature rise: the current caused to flow through may not be allowed to become so great as to cause the cable itself (and that means the insulation particularly) to be heated beyond a certain point.

When two (or more) cables are connected in parallel to carry unitedly a single alternating current, the current distributes itself between them in inverse ratio to impedance. Of course if the two (or more) cables be identically alike in size and structure, their impedances will be identical and, when connected in parallel, current flowing through will distribute itself equally between them. If then the two cables in their installation be similarly situated, so that heat dissipation is the same, the limitation imposed by temperature rise upon current-carrying capacity (mentioned above) will affect both equally, and in service the two (or more) branches will, as flow increases, carry current, each to the limit of its capacity.

But if the two cables connected in parallel be unequal in size (the current distributing itself in inverse ratio to impedance), the division of current will not (unless conceivably by sheer accident) be proportional to the current-carrying capacity as limited by temperature rise. So far as I know, no one hitherto has investigated the matter with sufficient care, to know that in any case the ratio in which the current distributes itself (determined by impedance) and the ratio of current-carrying capacity (determined by temperature rise) might even by accident be equal, when cables of different size are dealt with. Much less has it been known that there is possibility of correcting in an economical manner any inequality of this sort. And the art has practically resolved the matter, by concluding that generally speaking only cables of equal size should be connected in parallel,—otherwise the installation is (as is assumed) an uneconomical one, involving in one branch the use of a cable larger and more expensive than need be.

There are cases where for particular reasons it is advisable to apportion different amounts of current to different parallel cables of the same size. For example, one cable might be situated in a less favorable place in regard to heating than another, or one of the cables though equal to another in dimensions may be of different material, and of material which is unable to withstand the same temperature, or there may be other reasons. In such cases the problem stated above presents itself in another guise.

In many installations reactors are placed in series with cables. A reactor consists ordinarily of a coil of a few or many turns of heavy wire or rod, and its function is to limit the short-circuit current in case of breakdown—a function which has nothing directly to do with the problem here in hand. But indirectly the presence of a reactor in each of two cables connected in parallel does affect the problem of current flow; for the presence of the reactor changes the magnitude and phase of the current, and when two parallel lines of cable are under consideration, each provided with its own reactor (the reactors being usually of equal reactance), the division of current between the various cables is inversely proportional to the total impedance of reactor and cable in series. If the cables are of the same size and equal reactors are used, then equal currents would normally flow through each cable. If, however, cables of unequal size are used the division of current, controlled by the ratio of total impedances would not in general be such as to apportion the current to the cables, in accordance with current-carrying capacity, as limited by the temperature rise.

It has been well known in the past that, if two cables were to be connected in parallel and it were desired to divide the current in those circuits in any particular proportion, this could be done very satisfactorily, provided the resistances of the two cables or circuits were in inverse proportion to this required division of current. This could be accomplished by adding reactance to one of the cables or circuits such that the reactances would also be in inverse proportion to the desired division of current. It was known that, in this case, the current in the two cables or circuits would be in phase with each other and the vector sum would be equal to the arithmetical sum. However, it has been generally believed in the past that, if the resistances were not in this desired ratio, then it would be impossible to parallel these circuits economically. If the impedances were made in inverse proportion to the desired division of current, then it was known that the current in the two circuits or cables would not be in phase and that the numerical sum would not be equal to the vector sum. On the other hand, if the reactances were made in the same proportion as the resistances, by the addition of reactance to the proper one of the cables or circuits, then, the division of current would be in inverse proportion to the resistances and thus not in the required proportion. (The required division of current could be obtained by adding resistance as well as reactance to bring them into the required ratios, but the accomplishment of this by the use of added resistance would be very uneconomical and not to be considered in a practical case.)

Where two or more cables are connected in parallel, it is possible to cause any required division of current between the two cables, even when this required division of current is quite different from the inverse proportion of the resistances, by the simple addition of reactance, and to secure this result without undesirable phase difference in the currents. Reactors may be added to cables which are normally operated without reactors, or, in case reactors would otherwise be used for the current limiting purpose, these reactors may be so proportioned as to take care of my present purpose and without in any way impairing the primary reactor function, defined above. To follow out this idea, the primary consideration is to proportion the reactances so that the impedances of the various cables in parallel will be in inverse proportion to the required division of current. It is true, from the exact mathematical standpoint, that the old understanding is correct, that the vector sum of the currents will be less than the numerical sum, but I have found that this difference is comparatively small under practical conditions, even in the least favorable case, where no external reactance is placed in series with the cable which would otherwise carry less than its required proportion of the current. I have found, and herein lies my invention, that the difference between the vector and numerical sums may, in the situation under consideration, be reduced to any required amount by simply adding reactance to each of two parallel cables to the necessary extent, still keeping the ratio between the total impedances equal to the required proportion. In the practical case, where current limiting reactors are used, the value of reactance which is required for this purpose would usually be amply large, so that the mere proportioning of the reactances to give the required ratio of current will also take care in a very satisfactory manner of the relation between the vector and numeral sums of the current. It follows that cables unequal in size may be connected in parallel and give maximum efficiency in operation, or that distribution of current between parallel lines may be effected as the engineer wishes, regardless of relative size of cables, or relative quality of material, without appreciable loss of efficiency.

The change in value of the reactor spoken of above is a matter immediately understandable by an electrical engineer; but, lest the phrase seem vague, it will suffice to say that the reactance of the heavy coil of which the ordinary reactor is constituted may be changed by changing the number of turns or by changing the shape or size of the coil and that, in construction, adjustment of reactance is possible to any required degree of nicety. The added reactance may be made all at one end of the cable or cables, or it may be divided between the ends in any desired proportion. If the reactance is merely for the present purpose, it would probably be placed all at one end, but if used also as a current limiting device, it would ordinarily be divided equally between the two ends.

An example will illustrate the advantage gained by the use of my invention. Two three-conductor cables, each 1,000 feet long, will be assumed, each insulated with 3/32 inches impregnated paper insulation on the conductors and 3/32 inches impregnated paper insulation on the belt surrounding the three conductors, for operation at 3,000 volts, three phase, at a frequency of 25 cycles per second. The cables will be understood to be installed in ducts. One cable is 4/0 A. W. G. (211,600 circular mils), the other one is 600,000 circular mils. The allowable current as limited by temperature rise for the small cable is 256 amperes, and for the larger cable is 481 amperes. These values of current are normal for certain conditions of installation. The impedances of the two cables respectively are 0.0611 and 0.0238 ohm. But for introduced reactance, the current would not distribute itself proportionately to the allowable values, but in inverse proportion to the existing impedances. If the two cables are connected in parallel, the smaller cable could carry only 187 amperes if the larger one is limited to its allowable current of 481 amperes. The currents in the two cables would not be in phase, and the vector or actual sum of the currents in the cables would be 663 amperes, which is 90% of the maximum possible current of 737 amperes, which latter is of course the sum of the allowable currents, 256 and 481 amperes. Suppose the relative impedances be changed by the introduction of a reactor in one line only and on the reactor a value be imposed, such that the total impedances will be inversely proportional to the current carrying capacity, or in the phrase first used "allowable current." Then, in order to make the current divide in proportion to the allowable current, the total impedance of the second cable must be increased to 0.0353 ohm, and this is accomplished by placing in series with this cable a reactor whose reactance is 0.0139 ohm. If the cables are operated in parallel with this reactor in series with the larger one, the current will so distribute itself that both cables may be loaded to their full allowable current as stated above. The resultant vector current, namely, the actual useful current will be 700 amperes, which is 95% of the maximum possible current of 737 amperes.

According to my invention reactance is added in series with each of the two cables. As has already been explained, in such an installation, reactance may already be present in series with each of the two cables, but if so present, it is present for other purposes and in amounts which have no relation to the matter in hand. Let it be assumed that for such other purposes each cable is already provided with a reactor of one ohm reactance at twenty-five cycles. The allowable current, as limited by temperature rise, of the two cables will be the same as before. The impedances of the two cables, including the 1 ohm external reactance of the reactor will be respectively 1.014 and 1.011 ohms. I achieve my invention by imposing upon the reactors present in each of the two lines so arranged in parallel, such relative values as to give the desired ratio in total impedance, and such actual values as to cause the vector to approach in value the maximum possible current. In this case, in order to make the currents divide proportionally, the impedance of the smaller cable must be increased to 1.900 ohms, which means an added reactance of 0.889 ohm. The same result can of course be accomplished by diminishing the reactance in series with the larger cable, and keeping that of the small one constant, or by increasing the reactance in series with the smaller cable to a less amount and at the same time decreasing that in series with the larger cable. Assuming that the result is accomplished by increasing the reactance in series with the smaller cable to 1.900 ohms, the currents in the two cables will be the full allowable currents of 256 and 481 amperes respectively, and the vector or actual sum of the two currents will be the full 737 amperes, that is, differing from it by an entirely inappreciable amount, less than one one-hundredth of one per cent.

The accompanying drawing shows diagrammatically an installation of four single-conductor cables connected in parallel (or, it may be understood to illustrate one leg of a polyphase system). The several conductors are not shown to be different in size or quality, but it may be assumed that such differences exist, and that the installation is such as to bring all of the lines under like conditions. The lines are designated 1, 2, 3, and 4. In some at least of these lines reactors 5, 6, and 7 are included, each connected in the line in series. From what has gone before it will suffice here to say that my invention resides in selecting and arranging reactors of predetermined value, to the end that the total impedances of the lines 1, 2, 3, and 4, with their reactors, will be related in inverse ratio to current carrying capacity as limited by allowable temperature.

I claim as my invention:

In an electrical installation the combination of a plurality of conductors through which current is to flow, unequal in current-carrying capacity, connected in parallel, and a reactor connected in series with each of said elements, the said reactors being of such values that the total impedances of the lines of flow are in inverse ratio to carrying capacity, and the actual magnitudes of the reactances being such that the branches of the current carried shall in phase approximate one another.

In testimony whereof I have hereunto set my hand.

RALPH W. ATKINSON.

Witnesses:
GEORGE J. SHURTS,
C. B. HANLEIF.